United States Patent
Lee et al.

(10) Patent No.: US 10,762,302 B2
(45) Date of Patent: Sep. 1, 2020

(54) TRANSLATION METHOD AND APPARATUS, AND TRANSLATION SYSTEM

(71) Applicant: SAMSUNG ELECTRONICS CO., LTD., Suwon-si (KR)

(72) Inventors: Jihyun Lee, Suwon-si (KR); Hwidong Na, Suwon-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 15/715,956

(22) Filed: Sep. 26, 2017

(65) Prior Publication Data

US 2018/0210878 A1  Jul. 26, 2018

(30) Foreign Application Priority Data

Jan. 26, 2017  (KR) ........................ 10-2017-0012361

(51) Int. Cl.
*G06F 40/45* (2020.01)
*G06F 40/47* (2020.01)
*G06N 5/02* (2006.01)
*G06F 40/40* (2020.01)
*G06F 40/51* (2020.01)

(52) U.S. Cl.
CPC .............. *G06F 40/47* (2020.01); *G06F 40/40* (2020.01); *G06F 40/45* (2020.01); *G06F 40/51* (2020.01); *G06N 5/025* (2013.01)

(58) Field of Classification Search
None
See application file for complete search history.

(56) References Cited

U.S. PATENT DOCUMENTS

| 4,864,503 | A | * | 9/1989 | Tolin | G06F 40/279 704/2 |
| 5,680,627 | A | | 10/1997 | Anglea et al. | |
| 7,552,053 | B2 | * | 6/2009 | Gao | G06F 17/2827 704/258 |
| 7,711,543 | B2 | * | 5/2010 | Bangalore | H04N 21/44023 704/3 |

(Continued)

FOREIGN PATENT DOCUMENTS

| EP | 3 007 076 A1 | 4/2016 |
| KR | 10-2013-0099666 A | 9/2013 |

(Continued)

OTHER PUBLICATIONS

D. Bahdanau, et al., "Neural Machine Translation by Jointly Learning to Align and Translate," *Proceedings from the 4th International Conference on Learning Representations*, May 2015, pp. 1-15.

(Continued)

*Primary Examiner* — Neeraj Sharma
(74) *Attorney, Agent, or Firm* — NSIP Law

(57) ABSTRACT

A translation method includes: selecting a source word from a source sentence; generating mapping information including location information of the selected source word mapped to the selected source word in the source sentence; and correcting a target word, which is generated by translating the source sentence, based on location information of a feature value of the target word and the mapping information.

43 Claims, 14 Drawing Sheets

(56) References Cited

U.S. PATENT DOCUMENTS

| | | | | |
|---|---|---|---|---|
| 8,612,205 | B2* | 12/2013 | Hanneman | G06F 17/2827 704/2 |
| 8,655,641 | B2* | 2/2014 | Kumano | G06F 17/2854 704/2 |
| 9,836,457 | B2* | 12/2017 | Fujiwara | G06N 3/02 |
| 9,881,008 | B2* | 1/2018 | Park | G06F 40/40 |
| 10,261,994 | B2* | 4/2019 | Marcu | G06Q 10/0639 |
| 2008/0162111 | A1 | 7/2008 | Bangalore et al. | |
| 2008/0306727 | A1 | 12/2008 | Thurmair et al. | |
| 2008/0319736 | A1 | 12/2008 | Toutanova et al. | |
| 2011/0179073 | A1* | 7/2011 | Nilsson | G06F 9/454 707/769 |
| 2012/0101804 | A1 | 4/2012 | Roth et al. | |
| 2012/0185235 | A1* | 7/2012 | Albat | G06F 40/58 704/2 |
| 2013/0226556 | A1* | 8/2013 | Hwang | G06F 17/2818 704/2 |
| 2015/0161109 | A1 | 6/2015 | Talbot et al. | |
| 2016/0004692 | A1* | 1/2016 | Rogowski | G06F 17/2854 704/3 |
| 2016/0117316 | A1 | 4/2016 | Le et al. | |
| 2016/0179790 | A1 | 6/2016 | Watanabe et al. | |
| 2016/0343272 | A1* | 11/2016 | Roche | G06F 3/0481 |
| 2017/0220559 | A1* | 8/2017 | Fujiwara | G06F 17/2827 |
| 2018/0095949 | A1* | 4/2018 | Lewis | G06F 40/45 |
| 2018/0137102 | A1* | 5/2018 | Allen | G06F 40/242 |

FOREIGN PATENT DOCUMENTS

| | | |
|---|---|---|
| KR | 10-2016-0016769 A | 2/2016 |
| KR | 10-2016-0089210 A | 7/2016 |

OTHER PUBLICATIONS

M-T Luong, et al., "Effective Approaches to Attention-based Neural Machine Translation," *Cornell University Library, Computation and Language*, Aug. 2015 (11 pages, in English).

I. Sheikh, et al., "Learning to Retrieve Out-of-Vocabulary Words in Speech Recognition," *Cornell University Library, Computation and Language*, Nov. 2015, pp. 1-14.

C. Gulcehre, et al., "Pointing the Unknown Words," *Proceedings of the ACL 2016 Oral Paper, Subject: Computation and Language*, arXiv:1603.08148, Apr. 2016 (10 pages, in English).

W. Ling, et al., "Character-based Neural Machine Translation," *Proceedings from the 5th International Conference on Learning Representations*, May 2016, pp. 1-11.

Z. Tu, et al., "Modeling Coverage for Neural Machine Translation," *Cornell University Library, Computation and Language*, Aug. 2016 (11 pages, in English).

H. Choi, et al., "Context-Dependent Word Representation for Neural Machine Translation," *Computer Science & Language*, vol. 45, Sep. 2017, pp. 1-13.

Jesús Vilares, et al., "Character N-Grams Translation in Cross-Language Information Retrieval," *Proceedings of the 12th International Conference on Application of Natural Languages to Information Systems*, Paris, France, Jun. 2017, pp. 215-228.

Extended European Search Report dated Jun. 12, 2018, in corresponding European Application No. 17204434.4 (6 pages, in English).

\* cited by examiner

TRANSLATION METHOD AND APPARATUS, AND TRANSLATION SYSTEM

CROSS-REFERENCE TO RELATED APPLICATIONS

This application claims the benefit under 35 USC § 119(a) of Korean Patent Application No. 10-2017-0012361 filed on Jan. 26, 2017, in the Korean Intellectual Property Office, the entire disclosure of which is incorporated herein by reference for all purposes.

BACKGROUND

1. Field

The following description relates to a translation method and apparatus, and a translation system.

2. Description of Related Art

A user may translate a sentence, a paragraph, a phrase, or a word in a language different from a native language of the user using machine translation. However, when an error is included in a result of the machine translation, the user may not readily and correctly understand the result of the machine translation. Thus, correctly translating a sentence in another language may be important.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a translation method includes: selecting a source word from a source sentence; generating mapping information including location information of the selected source word mapped to the selected source word in the source sentence; and correcting a target word, which is generated by translating the source sentence, based on location information of a feature value of the target word and the mapping information.

The correcting of the target word may include determining whether the location information of the feature value is included in the mapping information, and in response to the location information of the feature value being included in the mapping information, replacing the target word with a source word mapped to the location information of the feature value.

The correcting of the target word may include, in response to the target word being determined based on sub-target words, determining a maximum feature value of each of the sub-target words; and, in response to location information of each maximum feature value being included in the mapping information, replacing the target word with a source word mapped to the location information of each maximum feature value.

The correcting of the target word may include selecting a target word corresponding to a preset type from a target sentence generated by completing translation of the source sentence, determining whether location information of a maximum feature value of the selected target word is included in the mapping information, and in response to the location information of the maximum feature value being included in the mapping information, replacing the selected target word with a source word mapped to the location information of the maximum feature value.

The correcting of the target word may include determining a target word based on sub-target words in a target sentence generated by completing translation of the source sentence, in response to the determined target word corresponding to a preset type, determining a representative value among respective maximum feature values of the sub-target words, determining whether location information of the representative value is included in the mapping information, and, in response to the location information of the representative value being included in the mapping information, replacing the determined target word with a source word mapped to the location information of the representative value.

The selected source word may correspond to any one of a proper noun, a numeral, a word including a numeral and a character, a word expressed by a target language, a word not registered in a dictionary, and a phrase including any one or any combination of any two or more of a proper noun, a numeral, a word including a numeral and a character, a word expressed by a target language, and a word not registered in a dictionary.

The translation method may further include preprocessing the selected source word.

The preprocessing of the selected source word may include changing a transcription of the selected source word.

The translation method may further include: in response to the source sentence being a subword-level sentence or a character-level sentence, converting sub-source words or sub-source characters in the source sentence to a single source word.

The generating of the mapping information may include, in response to the single source word corresponding to a preset type, mapping, to the single source word, location information of each of the sub-source words or the sub-source characters in the source sentence.

The target word may be generated by a neural machine translation of the source sentence.

The correcting a target word may be performed after completing translation of the source sentence into a target sentence.

The correcting a target word may be performed while translating the source sentence and before completing translation of the source sentence.

A non-transitory computer-readable storage medium may store instructions that, when executed by a processor, cause the processor to perform the method.

In another general aspect, a translation apparatus includes: a controller; and a memory storing an instruction executable by the controller, wherein the controller is configured to, in response to executing the instruction, select a source word from a source sentence, generate mapping information including location information of the selected source word mapped to the selected source word in the source sentence, and correct a target word, which is generated by translating the source sentence, based on location information of a feature value of the target word and the mapping information.

The controller may be configured to determine whether the location information of the feature value is included in the mapping information, and to replace the target word with a source word mapped to the location information of the feature value in response to the location information of the feature value being included in the mapping information.

The controller may be configured to determine a maximum feature value of each of sub-target words in response to the target word being determined based on the sub-target words, and to replace the target word with a source word mapped to location information of each maximum feature value in response to the location information of each maximum feature value being included in the mapping information.

The controller may be configured to determine whether location information of a maximum feature value of the selected target word is included in the mapping information, in response to a target word corresponding to a preset type being selected from a target sentence generated by completing translation of the source sentence. The controller may be configured to replace the selected target word with a source word mapped to the location information of the maximum feature value, in response to the location information of the maximum feature value of the selected target word being included in the mapping information.

The controller may be configured to determine a target word based on sub-target words in a target sentence generated by completing translation of the source sentence. The controller may be configured to, in response to the determined target word corresponding to a preset type, determine a representative value among respective maximum feature values of the sub-target words, and to determine whether location information of the representative value is included in the mapping information. The controller may be configured to replace the determined target word with a source word mapped to the location information of the representative value, in response to the location information of the representative value being included in the mapping information.

The selected source word may correspond to any one of a proper noun, a numeral, a word including a numeral and a character, a word expressed by a target language, a word not registered in a dictionary, and a phrase including any one or any combination of any two or more of a proper noun, a numeral, a word including a numeral and a character, a word expressed by a target language, and a word not registered in a dictionary.

The controller may be configured to preprocess the selected source word.

The controller may be configured to change a transcription of the selected source word.

The controller may be configured to convert sub-source words or sub-source characters in the source sentence to a single source word, in response to the source sentence being a subword-level sentence or a character-level sentence.

The controller may be configured to map, to the single source word, location information of each of the sub-source words or the sub-source characters in the source sentence, in response to the single source word corresponding to a preset type.

The target word may be generated by a neural machine translation of the source sentence.

The controller may be configured to correct the target word after completing translation of the source sentence into a target sentence.

The controller may be configured to correct the target word while translating the source sentence and before completing translation of the source sentence.

In another general aspect, a translation system includes: a sentence analyzer configured to select a source word from a source sentence, and to generate mapping information including location information of the selected source word mapped to the selected source word in the source sentence; a translator configured to determine target words based on a translation of the source sentence; and a corrector configured to, each time a target word, among the target words, is determined, determine whether to correct the determined target word based on location information of a feature value of the determined target word and the mapping information, or configured to, in response to a target sentence being completed by the translator, determine whether to correct a target word, among the target words, selected from the target sentence based on location information of a feature value of the selected target word and the mapping information.

The corrector may be configured to replace the determined target word with a source word mapped to location information of a maximum feature value of the determined target word, in response to the location information of the maximum feature value of the determined target word being included in the mapping information.

The corrector may be configured to replace the selected target word with a source word mapped to location information of a maximum feature value of the selected target word, in response to the location information of the maximum feature value of the selected target word being included in the mapping information.

The location information of the source word may indicate a location of the source word in the source sentence.

The feature value may indicate a degree to which a source word, among source words, contributes to determining the target word in performing a machine translation.

Other features and aspects will be apparent from the following detailed description, the drawings, and the claims.

Figure 1:
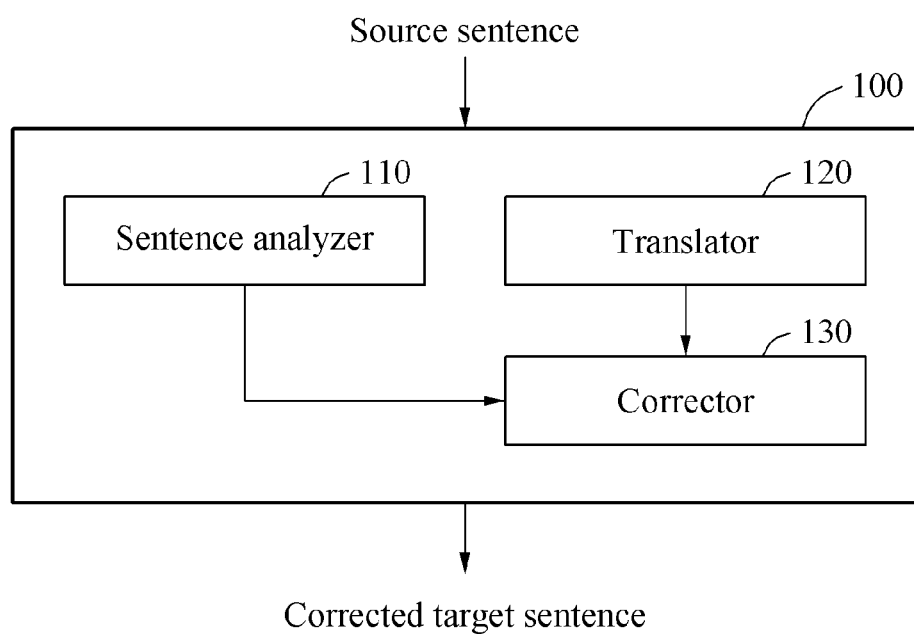
FIG. 1 is a diagram illustrating an example of operations of a translation system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of operations of a translation system 100.

Referring to FIG. 1, the translation system 100 includes a sentence analyzer 110, a translator 120, and a corrector 130.

The sentence analyzer 110 analyzes a source sentence. For example, the sentence analyzer 110 performs a morpheme analysis and a syntax analysis on the source sentence. The sentence analyzer 110 generates a copy list by analyzing the source sentence. The copy list includes at least one source word to be copied into a target sentence and location information (or position information) of each of the source words. A detailed operation of the sentence analyzer 110 will be described hereinafter with reference to FIG. 2.

The translator 120 completes the target sentence including target words by performing machine translation on the source sentence. For example, the translator 120 encodes the source sentence and sequentially determines the target words through decoding to complete the target sentence. A detailed operation of the translator 120 will be described hereinafter with reference to FIGS. 3 through 5.

The corrector 130 operates at each decoding time, for example, when each target word is determined, or operates when the target sentence is completed, for example, when an entire decoding is completed. In an example, when a target word at a current decoding time t is determined, the corrector 130 determines whether to correct the target word. The determination may be based on a location, or a position, of a source word associated with one or more feature values of the determined target word at the current decoding time t (e.g, a maximum feature value), and whether that location or position is on the copy list. Such an operation of the corrector 130 will be described with reference to FIGS. 6 and 7. In another example, when the target sentence is completed, the corrector 130 determines whether to correct some target words in the target sentence based on a location of a source word associated with one or more feature values (e.g, a maximum feature value) of the target words in the target sentence and whether that location of position is on the copy list. Such an operation of the corrector 130 will be described with reference to FIGS. 8 and 9.

Through the operation of the corrector 130 described in the foregoing, the translation system 100 generates a corrected target sentence. Thus, a translation error is minimized and a translation accuracy is improved accordingly.

Figure 2:
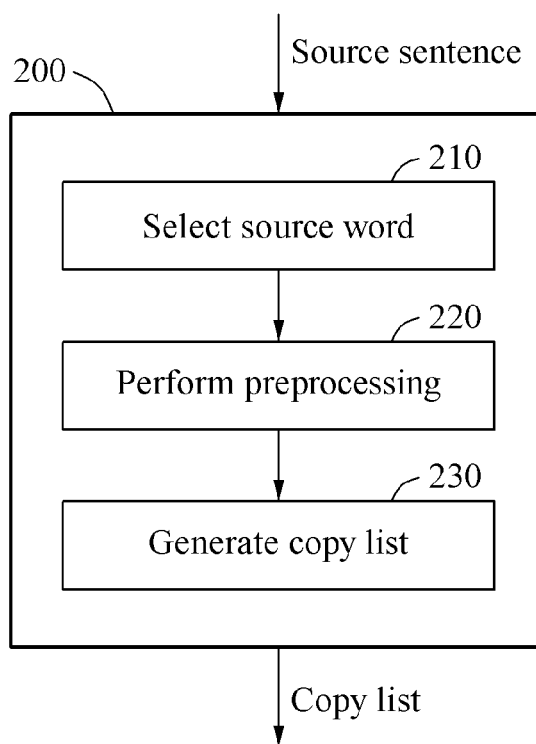
FIG. 2 is a diagram illustrating an example of operations of a sentence analyzer.

FIG. 2 is a diagram illustrating an example of operations of a sentence analyzer 200.

In the example of FIG. 2, the sentence analyzer 200 analyzes a first source sentence and a second source sentence, which are provided as follows.

First source sentence: 이후에 그 수치는 계속 감소했다. 1990년에 4,868,520명, 2000년에 4,019,991 명, 그리고 작년에 3,829,998명 이었다 .

Second source sentence: Hutton, 석미연, 및 Lee Jihyun 은 상속 받은 집을 팔았는데 양도 소득세 1000만원을 부과 받았다 .

Table 1 illustrates an example of location information of source words in the first source sentence, and Table 2 illustrates an example of location information of source words in the second source sentence.

TABLE 1

| Location information | Source word |
|---|---|
| 1 | 이후에 |
| 2 | 그 |
| 3 | 수치는 |
| 4 | 계속 |
| 5 | 감소했다 |
| 6 | . |
| 7 | 1990년에 |
| 8 | 4,868,520 |
| 9 | 명 |

TABLE 1-continued

| Location information | Source word |
|---|---|
| 10 | , |
| 11 | 2000년에 |
| 12 | 4,019,991 |
| 13 | 명 |
| 14 | , |
| 15 | 그리고 |
| 16 | 작년에 |
| 17 | 3,829,998 |
| 18 | 명 |
| 19 | 이었다 |

TABLE 2

| Location information | Source word |
|---|---|
| 1 | Hutton |
| 2 | , |
| 3 | 석미연 |
| 4 | , |
| 5 | 및 |
| 6 | Lee |
| 7 | Jihyun은 |
| 8 | 상속 |
| 9 | 받은 |
| 10 | 집을 |
| 11 | 팔았는데 |
| 12 | 양도 |
| 13 | 소득세 |
| 14 | 1000만 |
| 15 | 원을 |
| 16 | 부과 |
| 17 | 받았다 |

Referring to FIG. 2, in stage 210, the sentence analyzer 200 selects one or more source words from a source sentence. The sentence analyzer 200 selects, in advance, a source word from which a translation error may occur. In an example, the sentence analyzer 200 selects a source word corresponding to a preset type among source words in the source sentence. The sentence analyzer 200 selects a source word corresponding to any one of a proper noun, a numeral, a word including a numeral and a character, for example, an alphabetic character and a special character (e.g., an account number, a phone number, or a model name), a word expressed by a target language, a word that is not registered in a dictionary, and a compound noun or a phrase including any one or any combination of any two or more of proper noun, a numeral, a word including a numeral and a character, a word expressed by a target language, and a word that is not registered in a dictionary.

For example, the sentence analyzer 200 selects "1990," "4,868,520," "2000," "4,019,991," and "3,829,998" corresponding to a numeral from the first source sentence. Additionally, the sentence analyzer 200 selects "Hutton," "석미연," "Lee," and "Jihyun" corresponding to a proper noun from the second source sentence. The sentence analyzer 200 also selects "1000만" corresponding to a numeral from the second source sentence.

In stage 220, the sentence analyzer 200 preprocesses the selected source word. The sentence analyzer 200 changes a transcription of the selected source word. For example, the sentence analyzer 200 romanizes the proper noun "석미연" to be "Seok MiYeon," and changes "1000만" to "10 million" or "10,000,000." In addition, the sentence analyzer 200 processes selected source words as a single source word. For example, "Lee" and "Jihyun" are source words adjacent to each other without a comma, and thus the sentence analyzer 200 processes "Lee" and "Jihyun" as a single source word, "Lee Jihyun."

In stage 230, the sentence analyzer 200 generates a copy list including the selected source word and location information of the selected source word. In other words, the sentence analyzer 200 generates mapping information including the selected source word and the location information of the selected source word that are mapped to each other. When the selected source word is preprocessed, the sentence analyzer 200 maps the location information of the selected source word and a result of the preprocessing. For example, the sentence analyzer 200 maps "Seok MiYeon," which is a result of preprocessing "석미연," and location information 3 of "석미연." Also, the sentence analyzer 200 maps "10 million," which is a result of preprocessing "1000만," and location information 14 of "1000만." Similarly, the sentence analyzer 200 maps "Lee Jihyun," which is a result of preprocessing "Lee" and "Jihyun," and location information 6 of "Lee" and location information 7 of "Jihyun."

Table 3, below, illustrates an example of a copy list associated with the first source sentence, and Table 4, below, illustrates an example of a copy list associated with the second source sentence.

TABLE 3

| Location information | Source word |
|---|---|
| 7 | 1990 |
| 8 | 4,868,520 |
| 11 | 2000 |
| 12 | 4,019,991 |
| 17 | 3,829,998 |

TABLE 4

| Location information | Source word |
|---|---|
| 1 | Hutton |
| 3 | Seok MiYeon (preprocessing result) |
| 6 | Lee Jihyun (preprocessing result) |
| 7 | Lee Jihyun (preprocessing result) |
| 14 | 10 million |

A corrector (not shown), an example of which will be described later, uses the copy list generated by the sentence analyzer 200.

Figure 3:
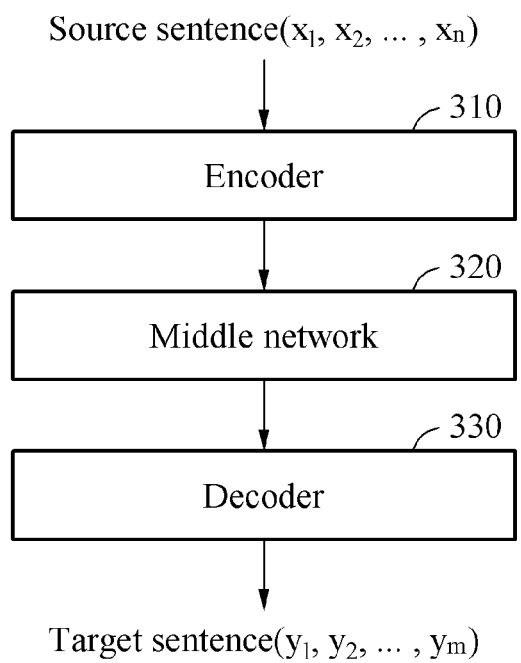
FIGS. 3 through 5 are diagrams illustrating an example of operations of a translator.
Figure 4:
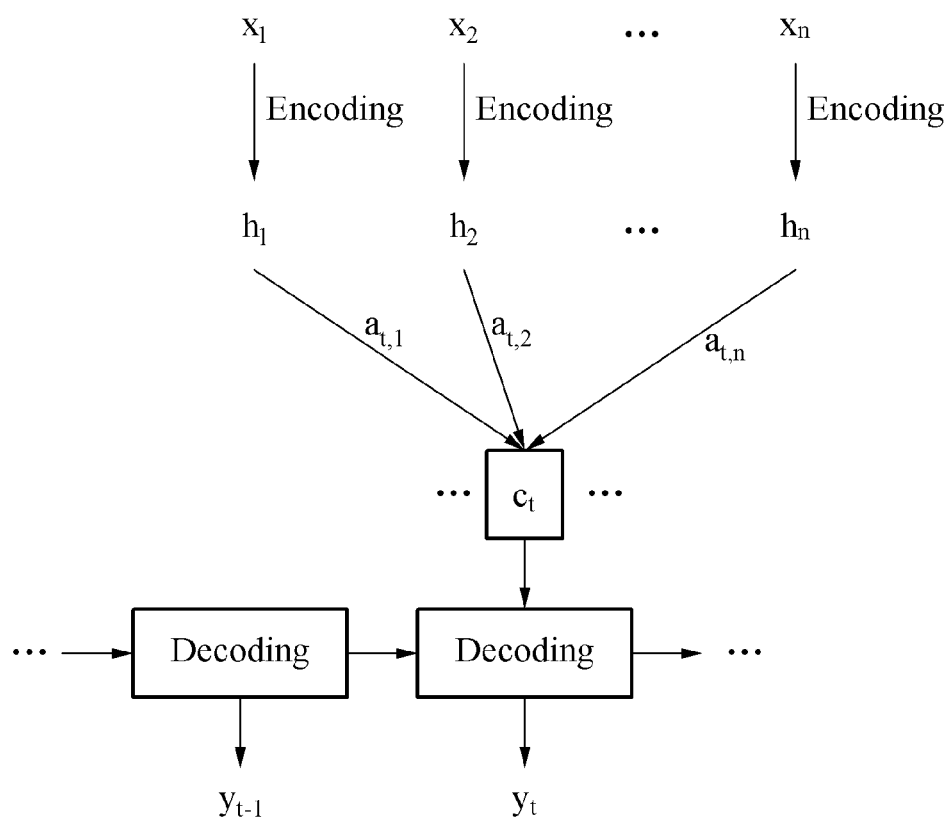
Figure 5:
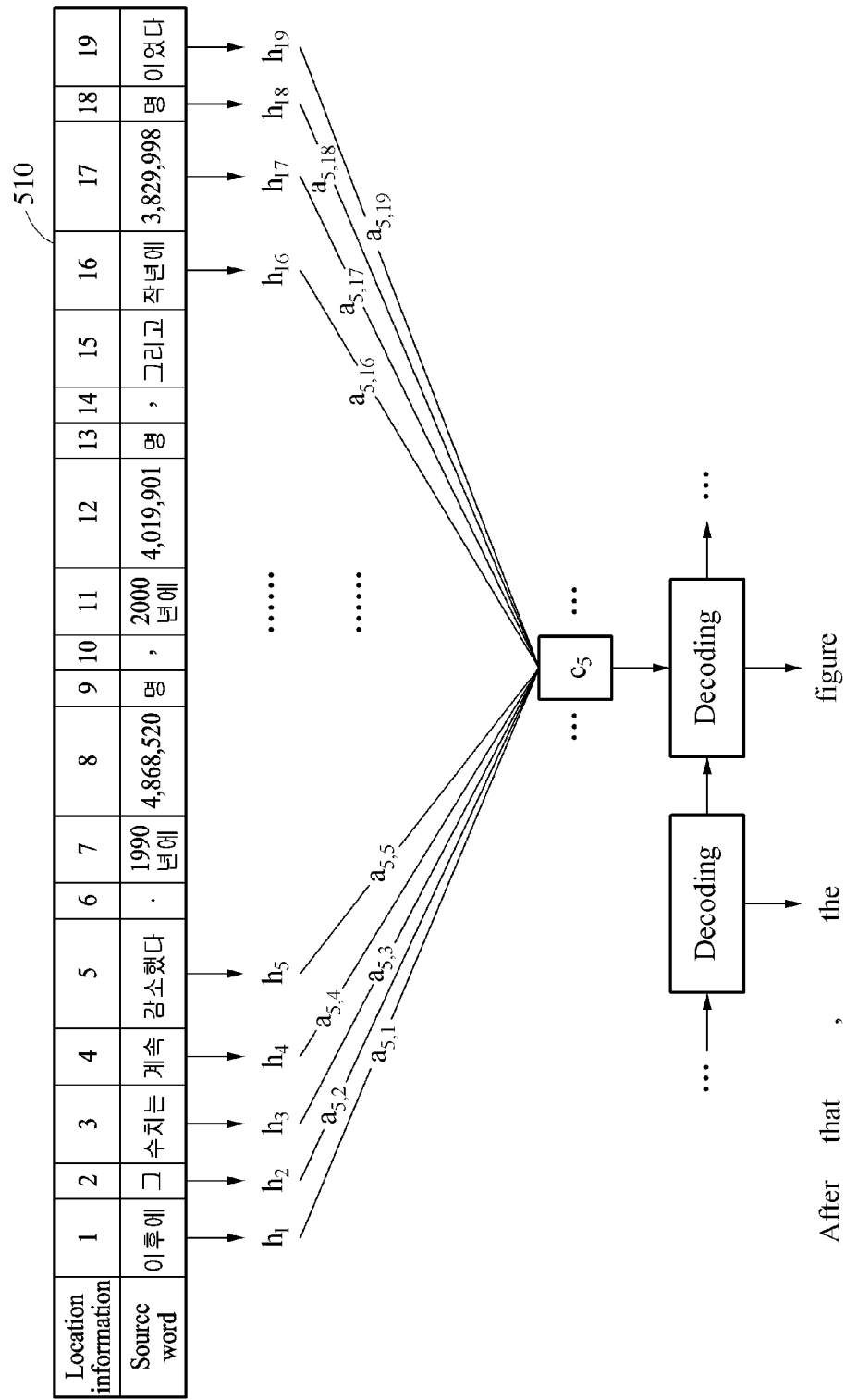

FIGS. 3 through 5 are diagrams illustrating an example of operations of a translator.

Referring to FIGS. 3 through 5, a translator is, for example, a neural machine translation (NMT) model including an encoder 310 configured to encode a source sentence and a decoder 330 configured to decode a result of the encoding to a target language. The encoder 310 and the decoder 330 are based on a neural network, for example, a recurrent neural network (RNN).

An attention mechanism is applied to the translator of the NMT model to align a source word and a target word corresponding to the source word. Referring to FIG. 3, the translator to which the attention mechanism is applied includes the encoder 310, the decoder 330, and a middle network 320 configured to calculate feature values used to determine a target word. A detailed operation of the translator to which the attention mechanism is applied will be described hereinafter with reference to FIGS. 4 and 5.

Referring to FIG. 4, the translator encodes each of source words, for example, $x_1, x_2, \ldots, x_n$, in a source sentence. A subscript in $x_1, x_2, \ldots, x_n$, for example, $1, 2, \ldots,$ and $n$, denotes location information of each of the respective source words $x_1, x_2, \ldots, x_n$. As a result of encoding the source words, respective vectors, for example, $h_1, h_2, \ldots, h_n$, are generated. Each of the vectors $h_1, h_2, \ldots, h_n$ is a real number vector.

When the source words are encoded, the translator determines target words in sequential order through decoding. In the example of FIG. 4, a target word $y_t$ is to be determined, which indicates that a current decoding time is t.

The translator calculates feature values $a_{t,1}, a_{t,2}, \ldots, a_{t,n}$. The translator calculates the feature values $a_{t,1}, a_{t,2}, \ldots, a_{t,n}$ based on RNN hidden state information $s_{t-1}$ associated with a target word $y_{t-1}$ at a previous decoding time t−1 and the vectors $h_1, h_2, \ldots, h_n$. For example, the translator calculates $a_{t,1}$ based on $s_{t-1}$ and $h_1$. The translator calculates the remaining feature values $a_{t,2}, \ldots, a_{t,n}$ through a similar method used to calculate the feature value $a_{t,1}$.

A feature value indicates how much a vector or a source word contributes to determining the target word $y_t$. For example, $a_{t,1}$ indicates a degree of a contribution of $h_1$, or a source word corresponding to location information 1, to the determination of the target word $y_t$. Similarly, $a_{t,n}$ indicates a degree of a contribution of $h_n$, or a source word corresponding to location information n, to the determination of the target word $y_t$. Such a feature value is also referred to as an attention value.

The translator calculates a context vector $c_t$ using the feature values and the vectors. For example, the translator calculates $c_t = a_{t,1} \times h_1 + a_{t,2} \times h_2 + \ldots + a_{t,n} \times h_n$.

The translator determines RNN hidden state information $s_t$ at the current decoding time t based on the RNN hidden state information $s_{t-1}$ associated with the target word $y_{t-1}$ at the previous decoding time t−1 and on the target word $y_{t-1}$ at the previous decoding time t−1. The translator determines the target word $y_t$ by performing decoding based on the RNN hidden state information $s_t$ at the current decoding time t.

In the example of FIG. 5, a first source sentence 510 is input to the translator. The translator encodes each of source words in the first source sentence 510, and generates respective vectors $h_1, h_2, \ldots, h_{19}$ for the source words as a result of the encoding.

Referring to FIG. 5, when the translator determines four target words "After," "that," ", (comma)," and "the," it is time for the translator to determine a fifth target word according to a sequential order. Thus, a current decoding time t is 5 (t=5) and the translator calculates feature values $a_{5,1}, a_{5,2}, \ldots, a_{5,19}$. The translator calculates a context vector $c_5$ using the vectors $h_1, h_2, \ldots, h_{19}$ and the feature values $a_{5,1}, a_{5,2}, \ldots, a_{5,19}$. The translator determines RNN hidden state information at the current decoding time t based on the context vector $c_5$, RNN hidden state information associated with a previous target word "the," and the previous target word "the." The translator determines a target word "figure" by performing decoding based on RNN hidden state information at the current decoding time t. A contribution of a vector $h_3$, or a source word "수치는," to the determination of the target word "figure" is greatest, and thus $a_{5,3}$ corresponds to a maximum feature value among $a_{5,1}, a_{5,2}, \ldots, a_{5,19}$.

The translator determines a target word at each subsequent decoding time, and completes a target sentence including determined target words.

Figure 6:
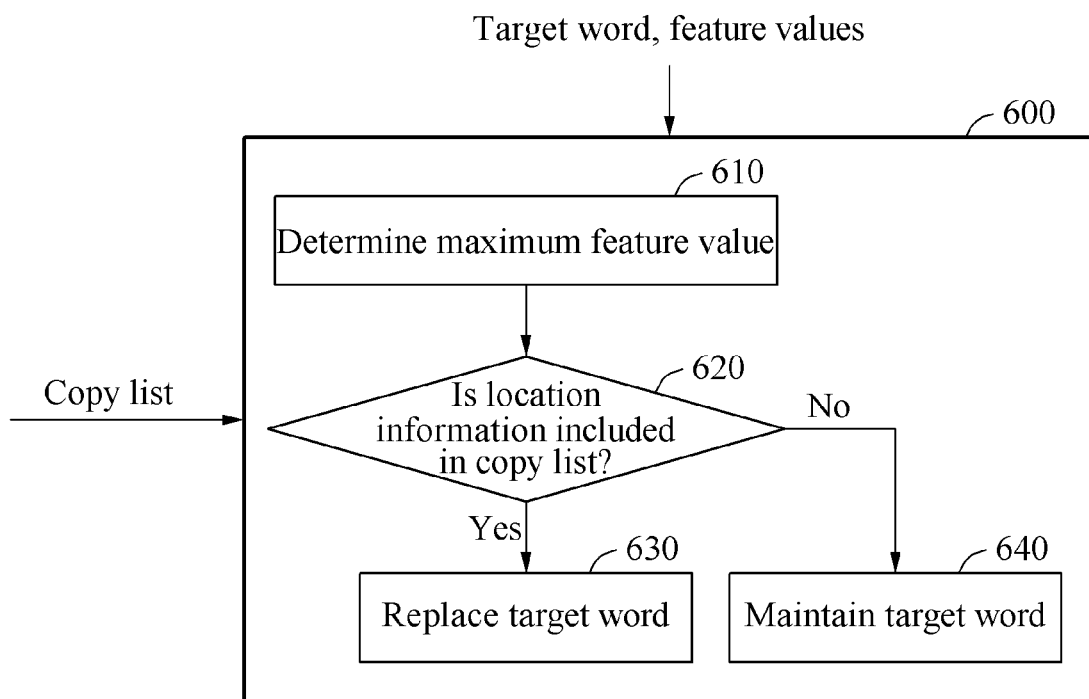
FIGS. 6 and 7 are diagrams illustrating an example of operations of a corrector.
Figure 7:
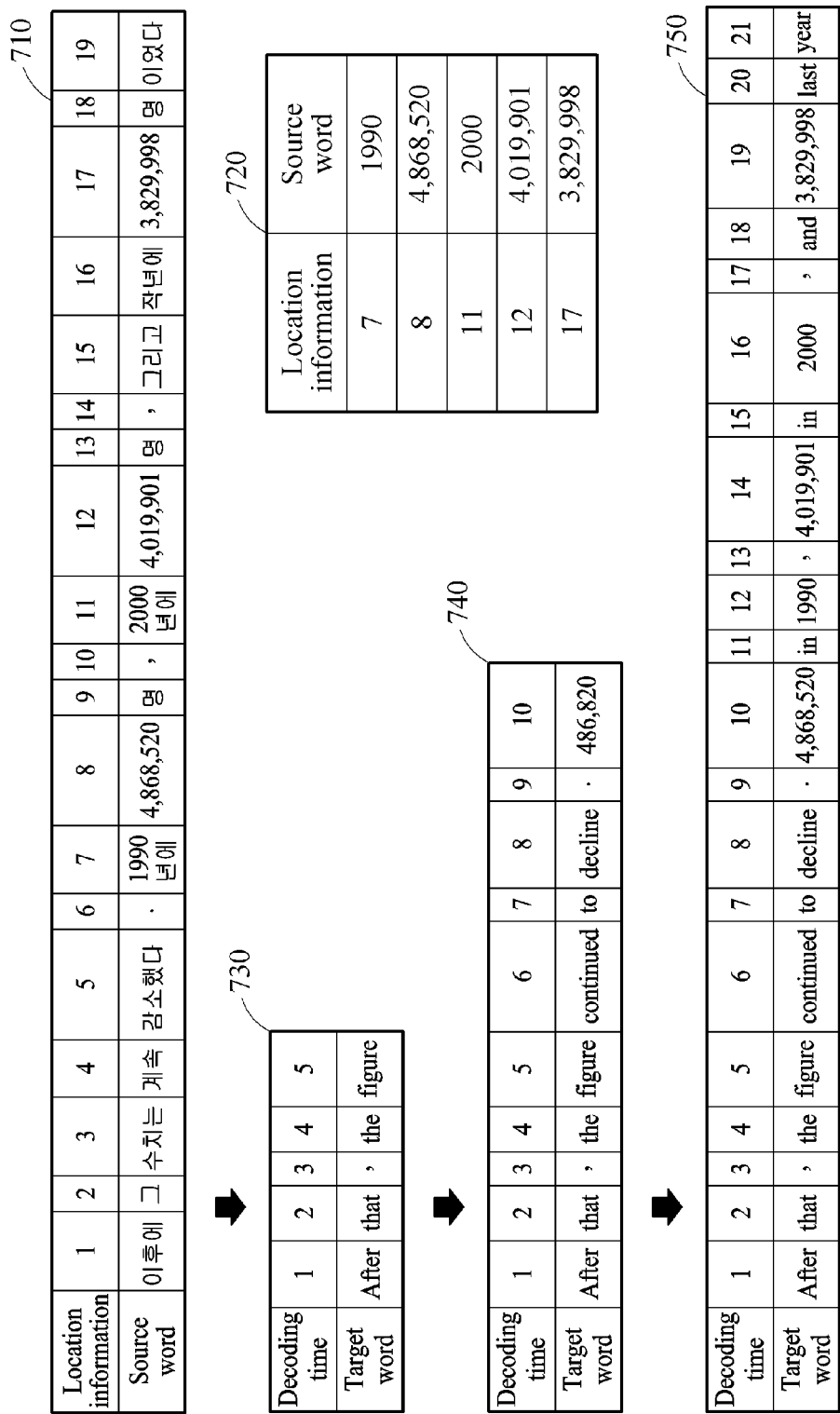

FIGS. 6 and 7 are diagrams illustrating an example of operations of a corrector 600.

FIG. 6 illustrates a flow of operations of a corrector 600 to be performed when a target word $y_t$ is determined at a current decoding time t. Referring to FIG. 6, in operation 610, the corrector 600 determines a maximum feature value of the target word $y_t$. The maximum feature value refers to a greatest value among feature values $a_{t,1}, a_{t,2}, \ldots, a_{t,n}$ associated with the target word $y_t$. In operation 620, the corrector 600 determines whether location information of the maximum feature value is included in a copy list. The location information of the maximum feature value indicates location information of a source word corresponding to a vector used to calculate the maximum feature value. In operation 630, in response to the location information of the maximum feature value being included in the copy list, the corrector 600 replaces the target word $y_t$ by a source word mapped to the location information of the maximum feature value. In operation 640, in response to the location information of the maximum feature value not being included in the copy list, the corrector 600 maintains the target word $y_t$. In other words, when the location information of the maximum feature value is not included in the copy list, the corrector 600 does not correct the target word $y_t$.

As illustrated in FIG. 7, in stage 730, the translator determines a target word "figure" at decoding time 5. The corrector determines a maximum feature value among feature values of the target word "figure," for example, $a_{5,1}, a_{5,2}, \ldots, a_{5,19}$. Here, $a_{5,3}$ corresponds to the maximum feature value among $a_{5,1}, a_{5,2}, \ldots, a_{5,19}$. Such a maximum feature value is described with reference to FIG. 5, and thus a more detailed and repeated description of the maximum feature value is omitted here for brevity. When the maximum feature value is determined, the corrector verifies location information of $a_{5,3}$. For example, a vector $h_3$ is used to calculate $a_{5,3}$, and thus the corrector verifies, to be the location information of $a_{5,3}$, location information 3 of a source word corresponding to the vector $h_3$. The corrector determines whether location information 3 is included in a copy list 720. Since location information 3 is not included in the copy list 720, the corrector maintains the target word "figure."

In stage 740, the translator sequentially determines target words at decoding times 6 through 9, and determines a target word "486,820" at decoding time 10. The corrector determines a maximum feature value among feature values $a_{10,1}, a_{10,2}, \ldots, a_{10,19}$ of the target word "486,820." The translator focuses most on a source word "4,868,520" corresponding to location information 8 to determine the target word "486,820" because $a_{10,8}$ corresponds to the maximum feature value among $a_{10,1}, a_{10,2}, \ldots, a_{10,18}$. The corrector determines whether location information 8 of $a_{10,8}$ is included in the copy list 720. Since location information 8 is included in the copy list 720, the corrector replaces the target word "486,820" by "4,868,520" mapped to location information 8 in the copy list 720.

The translator determines a target word at each subsequent decoding time, and the corrector corrects or does not correct determined target words at subsequent decoding times.

A corrected target sentence 750 includes corrected target words. In the corrected target sentence 750, the target word "486,820" is replaced with the corrected target word "4,868, 520" by the corrector, and thus it may be determined that a translation error is reduced and a translation accuracy is improved.

Figure 8:
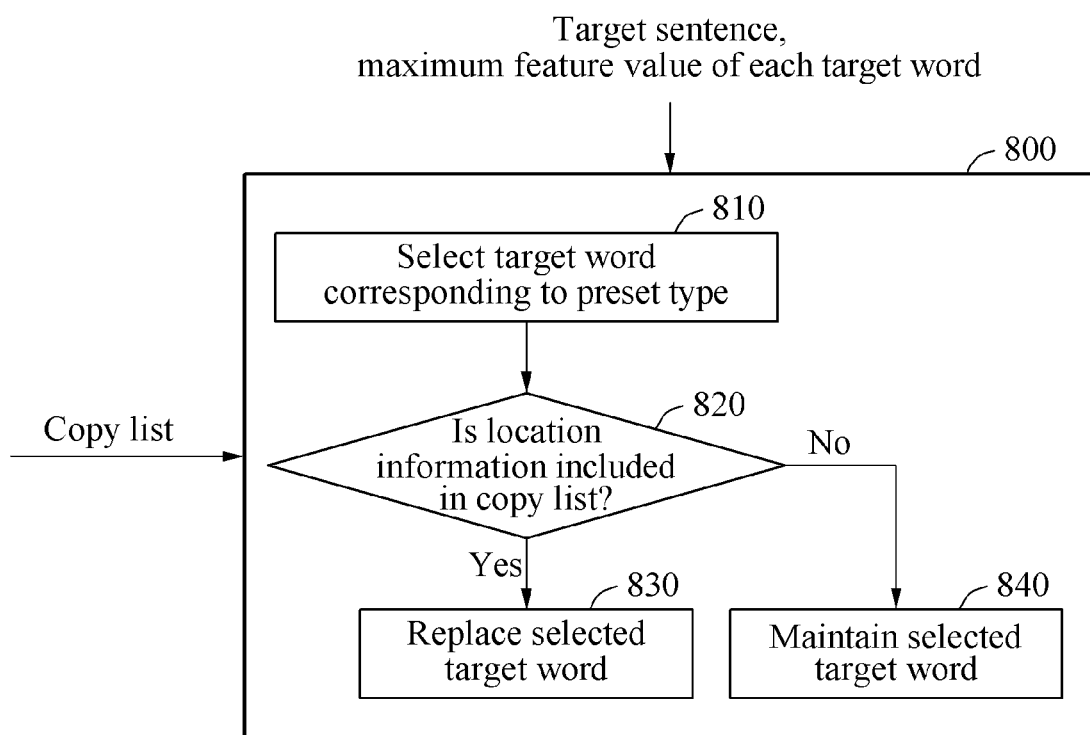
FIGS. 8 and 9 are diagrams illustrating another example of operations of a corrector.
Figure 9:
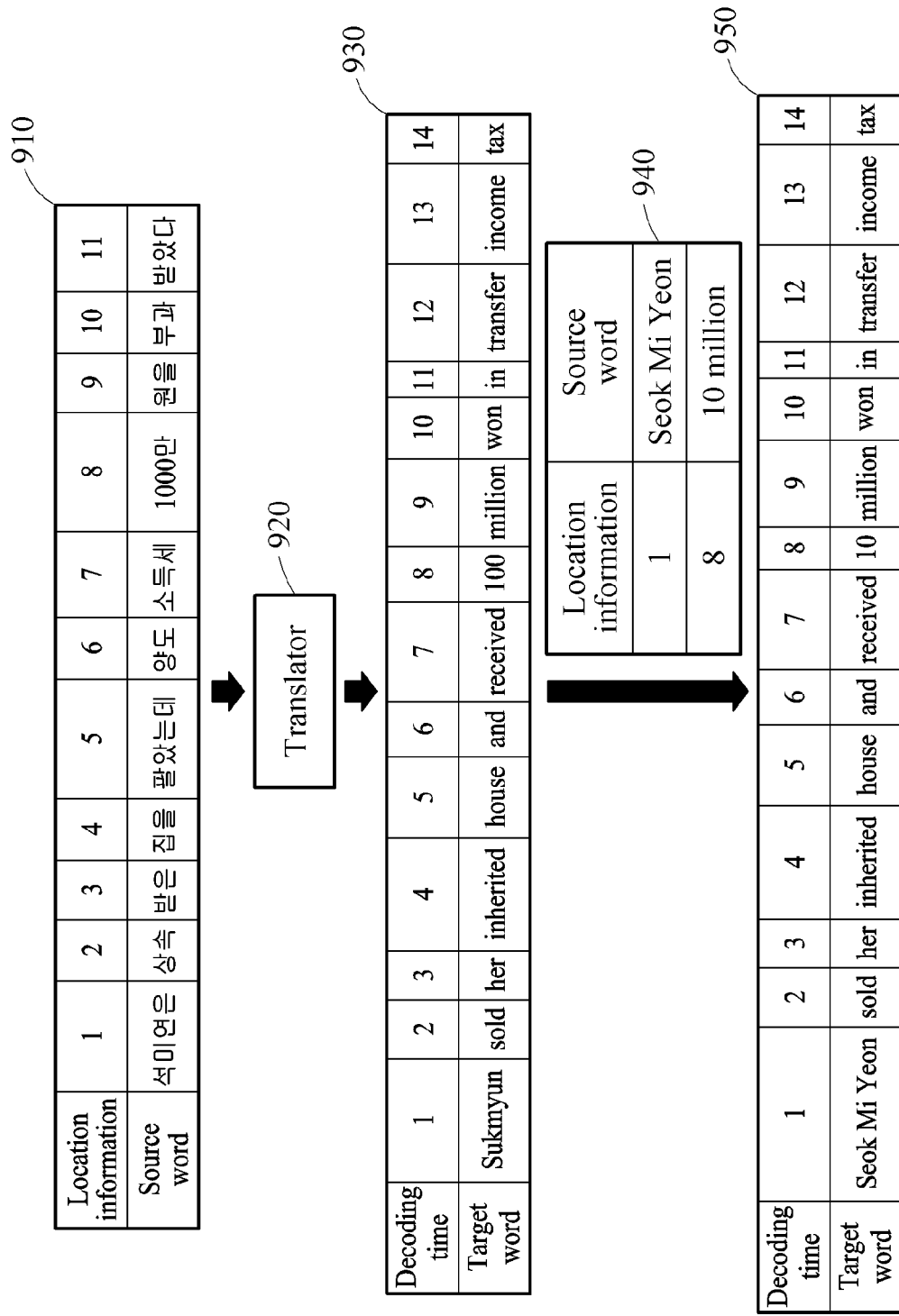

FIGS. 8 and 9 are diagrams illustrating another example of operations of a corrector 800.

FIG. 8 illustrates a flow of operations of the corrector 800 to be performed when a target sentence is completed. Referring to FIG. 8, the corrector 800 receives, from a translator, the target sentence and a maximum feature value of each of target words in the target sentence. The corrector 800 determines whether each of the target words corresponds to a preset type. In operation 810, the corrector 800 selects one or more target words corresponding to the preset type for which correction may be needed. In operation 820, the corrector 800 determines whether location information of a maximum feature value of the selected target word is included in a copy list. In operation 830, in response to the location information of the maximum feature value being included in the copy list, the corrector 800 replaces the selected target word with a source word mapped to the location information of the maximum feature value. In operation 840, in response to the location information of the maximum feature value not being included in the copy list, the corrector 800 maintains the selected target word.

As illustrated in FIG. 9, when a translator 920 completes a target sentence 930 corresponding to a source sentence 910, a corrector receives, from the translator 920, the target sentence 930 and a maximum feature value of each of target words including, for example, a maximum feature value $a_{1,1}$ of "Sukmyun." As described above about the maximum feature value, a source word "석미연은" corresponding to location information 1 contributes greatest to determining "Sukmyun," and thus the maximum feature value of "Sukmyun" is $a_{1,1}$.

The corrector selects, from the target sentence 930, a target word corresponding to a preset type, for example, a proper noun, a numeral, a word including a numeral and a character, and a word that is not registered in a dictionary. The corrector selects, from the target sentence 930, "Sukmyun" corresponding to a word not registered in a dictionary or a proper noun, and "100" and "million" corresponding to a numeral.

The corrector verifies location information of each of the maximum feature value $a_{1,1}$ of "Sukmyun," a maximum feature value $a_{8,8}$ of "100," and a maximum feature value $a_{9,8}$ of "million." The corrector verifies the location information of $a_{1,1}$ to be location information 1, and the location information of $a_{8,8}$ and $a_{9,8}$ to be location information 8.

The corrector determines whether location information 1 is included in a copy list 940. Since location information 1 is included in the copy list 940, the corrector replaces "Sukmyun" with "Seok MiYeon" mapped to location information 1.

The maximum feature values of the selected target words "100" and "million" have the same location information. As illustrated in FIG. 9, the location information of $a_{8,8}$ and the location information of $a_{9,8}$ are the same as location information 8. In such a case, when the location information is included in the copy list 940, the corrector replaces the selected target words with a source word mapped to the location information. In the example of FIG. 9, location information 8 is included in the copy list 940, and thus the corrector replaces "100 million," which is obtained by sequentially combining the selected target words "100" and "million," with "10 million" mapped to location information 8.

The target sentence 930 is corrected to be a corrected target sentence 950. In a case in which a proper noun in the source sentence 910 is either processed as an unknown word or not correctly translated, the corrected target sentence 950 includes the proper noun, or a preprocessed proper noun, of the source sentence 910. For example, when a proper noun "석미연" is translated as "Sukmyun" and not processed as an unknown word, a preprocesses proper noun "Seok Mi Yeon" replaces it in the corrected target sentence 950. Thus, a translation accuracy may be improved and a translation error may be reduced.

Translation of a Subword-Unit Source Sentence: a Subword-Level Machine Translation According to one example, a translation system may translate a word-unit source sentence as described with reference to FIGS. 1 through 9. According to another example, the translation system may translate a subword-unit source sentence. An example of which will be described hereinafter with reference to FIG. 10.

Figure 10:
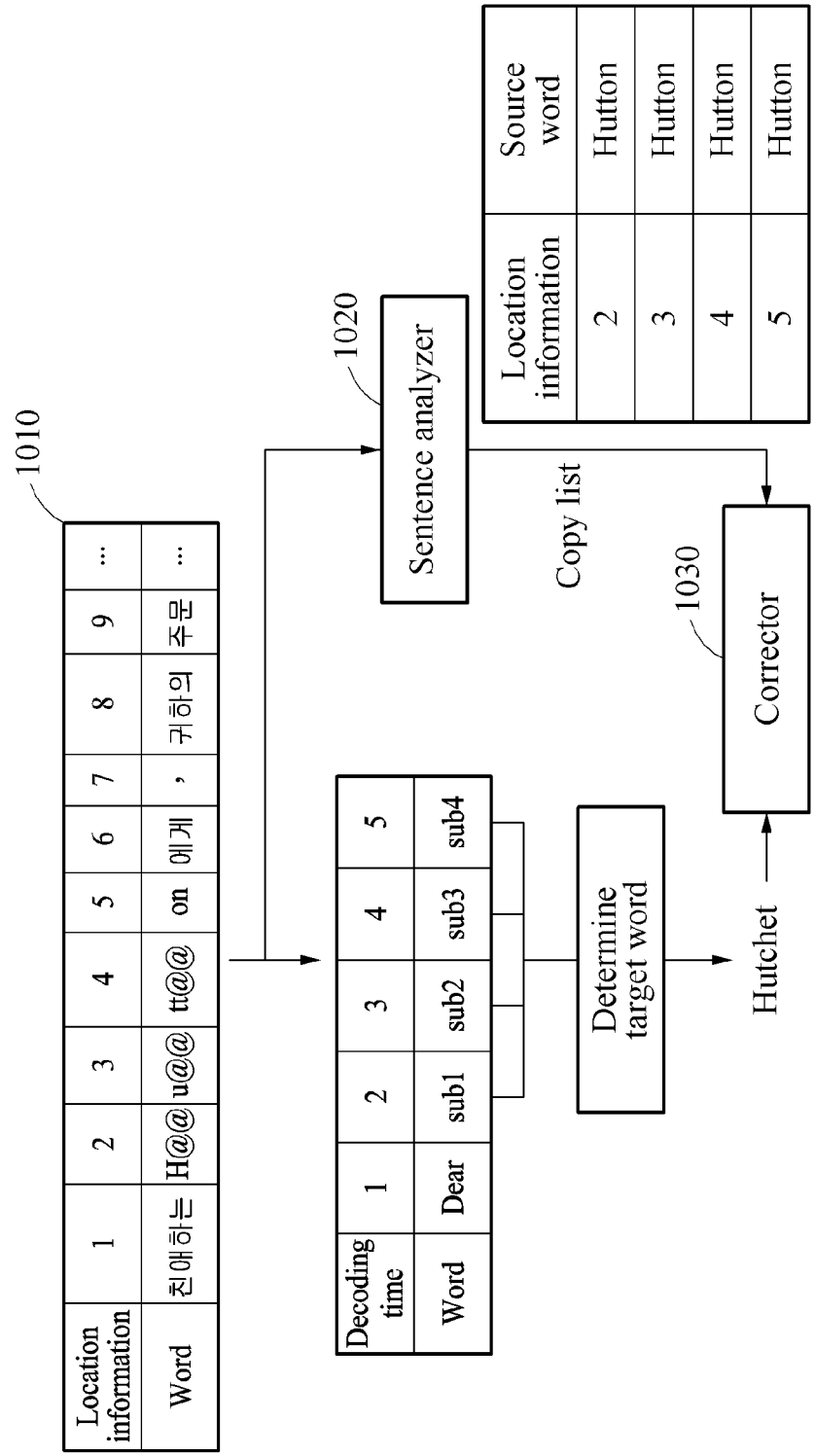
FIG. 10 is a diagram illustrating another example of operations of a translation system.

FIG. 10 is a diagram illustrating another example of operations of a translation system.

A translation system may convert an original word-unit source sentence to a subword-unit source sentence. In the example of FIG. 10, the translation system divides an original source word "Hutton" into sub-source words "H@@," "u@@," "tt@@," and "on." Thus, an original source sentence "친애하는 Hutton에게, 귀하의 주문 . . . " is converted to a source sentence 1010 "친애하는 H@@ u@@ tt@@ on 에게, 귀하의 주문 . . . "

The sub-source words "H@@," "u@@," and "tt@@" include a tag @@ indicating a subword, and the sub-source word "on" does not include the tag. The sub-source word "on" is a last sub-source word of the original source word "Hutton," and thus the sub-source word "on" does not include the tag.

A sentence analyzer 1020 converts the subword-unit source sentence 1010 to a word-unit sentence through preprocessing. That is, the sentence analyzer 1020 generates a single source word by combining the sub-source words through the preprocessing. For example, the sentence analyzer 1020 generates a single source word "Hutton" by combining the sub-source words "H@@," "u@@," "tt@@," and "on."

The sentence analyzer 1020 determines whether the single source word corresponds to a preset type. In response to the single source word corresponding to the preset type, the sentence analyzer 1020 maps location information of each of the sub-source words to the single source word. For example, the sentence analyzer 1020 maps, to "Hutton," location information 2 of "H@@," location information 3 of "u@@," location information 4 of "tt@@," and location information 5 of "on." The sentence analyzer 1020 generates a copy list including the mapped location information of each of the sub-source words and the single source word. Table 5 illustrates an example of the copy list associated with the source sentence 1010.

TABLE 5

| Location information | Source word |
|---|---|
| 2 | Hutton |
| 3 | Hutton |
| 4 | Hutton |
| 5 | Hutton |

A translator encodes the source sentence 1010 including the sub-source words. The translator may be, for example, a subword-level NMT model.

The translator calculates feature values $a_{2,1}, a_{2,2}, \ldots, a_{2,n}$ to determine a second target word after a first target word "Dear" is determined. Since the sub-source word "H@@" includes the tag, the second target word includes the tag. In other words, the second target word corresponds to a sub-target word of a subword unit. The second target word, which is a first determined sub-target word $sub_1$, is "H@@."
Similarly, the translator determines sub-target words $sub_2$ through $sub_4$ in sequential order. Here, $sub_2$ is "u@@," $sub_3$ is "tch@@," and $sub_4$ is "et."

In this example, $a_{2,2}$ is a maximum feature value among feature values of "H@@," for example, $a_{2,1}, a_{2,2}, \ldots, a_{2,n}$, and $a_{3,3}$ is a maximum feature value among feature values of the sub-target word "u@@," for example, $a_{3,1}, a_{3,2}, \ldots, a_{3,n}$. Also, $a_{4,4}$ is a maximum feature value among feature values of the sub-target word "tch@@," for example, $a_{4,1}, a_{4,2}, \ldots, a_{4,n}$, and $a_{5,5}$ is a maximum feature value among feature values of the sub-target word "et," for example, $a_{5,1}, a_{5,2}, \ldots, a_{5,n}$. Determining a maximum feature value among feature values is described above, and thus a more detailed and repeated description of the determining of the maximum feature value is omitted here for brevity.

The translator determines a target word based on the determined sub-target words. In the example of FIG. 10, decoding is not correct, and thus such sub-target words as "H@@," "u@@," "tch@@," and "et" are determined. Thus, a target word "Hutchet" that does not correspond to the original source word is determined and a translation error occurs.

A corrector 1030 operates when a target word is determined based on sub-target words, or operates when a target sentence is completed. When the target word is determined based on the sub-target words, the corrector 1030 operates as follows.

In one example, when the target word "Hutchet" is determined, the corrector 1030 corrects the target word "Hutchet" based on whether location information of a maximum feature value of each of the sub-target words is included in the copy list. In other words, according to this example, the corrector 1030 may correct the target word "Hutchet" immediately after the target word "Hutchet" is determined, prior to the target sentence being completed. Referring to the copy list illustrated in FIG. 10, location information 2 of $a_{2,2}$, location information 3 of $a_{3,3}$, and location information 4 of $a_{4,4}$, and location information 5 of $a_{5,5}$ are included in the copy list. In such a case, the corrector 1030 replaces the target word "Hutchet" with "Hutton."

According to another example, the corrector 1030 may determine a representative value of respective maximum feature values of the sub-target words. For example, the corrector 1030 may select any one of the maximum feature values of the sub-target words. The corrector 1030 may determine whether location information of the representative value is included in the copy list. In response to the location information of the representative value being included in the copy list, the corrector 1030 may replace the target word with a source word mapped to the location information of the representative value. In the example of FIG. 10, the corrector 1030 determines a representative value among $a_{2,2}, a_{3,3}, a_{4,4}$, and $a_{5,5}$. For example, the corrector 1030 determines, to be the representative value, a greatest value among $a_{2,2}, a_{3,3}, a_{4,4}$, and $a_{5,5}$ or a value closest to a mean value of $a_{2,2}, a_{3,3}, a_{4,4}$, and $a_{5,5}$. In this case, in response to the corrector 1030 determining $a_{2,2}$ to be the representative value, the corrector 1030 determines whether location information 2 of $a_{2,2}$ is included in the copy list. Since location information 2 of $a_{2,2}$ is included in the copy list, the corrector 1030 replaces the target word "Hutchet" with the source word "Hutton" mapped to location information 2.

Thus, the original source word "Hutton" is included in the target sentence, and thus a translation error may be reduced.

When the target word is determined based on the sub-target words, the corrector 1030 operates as described above. When the target sentence is completed, the corrector 1030 operates as follows. In one example, the translator or the corrector 1030 operates on the target sentence "Dear H@@ u@@ tch@@ et, your order . . . " and converts the subword-based target sentence to a word-based sentence. For example, the translator or the corrector 1030 determines "Hutchet" based on "H@@," "u@@," "tch@@," and "et," and converts the target sentence "Dear H@@ u@@ tch@@ et, your order . . . " to "Dear Hutchet, your order . . . "

The corrector 1030 selects a target word corresponding to a preset type from the target sentence obtained through the converting of the subword-based target sentence. For example, the corrector 1030 selects "Hutchet" corresponding to a word not registered in a dictionary or corresponding to a proper noun from the target sentence obtained through the converting. For subsequent operations of the corrector 1030, reference may be made to the description of the operations of the corrector 1030 performed when a target word is determined based on sub-target words. Thus, a more detailed and repeated description of such operations is omitted here for brevity.

Translation of a Character-Unit Source Sentence: a Character-Level Machine Translation According to still another example, the translation system may translate a character-unit source sentence. The translation system may process each of characters in a character-unit source sentence using a method similar to a subword processing method described above with reference to FIG. 10, and complete a translation of the character-unit source sentence. An example of which will be described in detail hereinafter.

For example, when the translation system receives an original source sentence "친애하는 Hutton에게, 귀하의 주문 . . ." as an input, the translation system inputs a tag @ to a location of a word spacing in the original source sentence to convert the original source sentence to a character-unit source sentence "친_애_하_는 @Hutton에_게, @귀_하_의_주_문 @ . . . " Here, the translation system considers @ to be a single character, and _ is used as an indicator to distinguish each character in the character-unit source sentence.

A sentence analyzer generates a copy list as illustrated in Table 6 below by mapping, to a source word "Hutton" in the original source sentence, location information 6 of a character "H" and location information 11 of a character "n" in the character-unit source sentence "친_애_하_는 @Hutton에_게, @귀_하_의 @주_문 @ . . . " Here, the mapping of location information of each sub-source word and a source word may be applicable to the mapping of location information of each character and a source word, and thus more detailed and repeated descriptions will be omitted for brevity.

TABLE 6

| Location information | Source word |
| --- | --- |
| 6 | Hutton |
| 7 | Hutton |
| 8 | Hutton |
| 9 | Hutton |
| 10 | Hutton |
| 11 | Hutton |

A translator encodes the character-unit source sentence, and performs decoding based on a result of the encoding. The translator may be, for example, a character-level NMT model. The translator determines a target character each time the translator performs the decoding. Here, the translator may determine the target character using a method similar to a target word determining method performed by the translator described with reference to FIGS. 3 through 5, or to a sub-target word determining method performed by the translator described with reference to FIG. 10, and thus more detailed and repeated descriptions will be omitted for brevity.

When the translator determines target characters "H_u_t_c_h_e_t" by performing the decoding, the translator determines a target word "Hutchet" based on the determined target characters. Here, a corrector replaces the target word "Hutchet" with a source word "Hutton" included in the copy list of Table 6. In other words, the corrector replaces the target word "Hutchet" with the source word "Hutton" before a translation is completed. Alternatively, when a translation of the character-unit source sentence into a character-unit target sentence is completed and the character-unit target sentence is converted to a word-unit target sentence, the corrector may correct the word-unit target sentence. For example, when a character-unit target sentence is "D_e_a_r_@_H_u_t_c_h_e_t_, @_y_o_u_r_ @_o_r_d_e_r . . . ", the translator converts the character-unit target sentence to a word-unit target sentence "Dear Hutchet, your order . . . " Here, the corrector replaces a target word "Hutchet" in the word-unit target sentence to a source word "Hutton" included in the copy list of Table 6.

The operations of the corrector described above with reference to FIGS. 6 and 10 may be applicable to how the corrector replaces "Hutchet" with "Hutton," and thus more detailed and repeated descriptions will be omitted for brevity.

Figure 11:
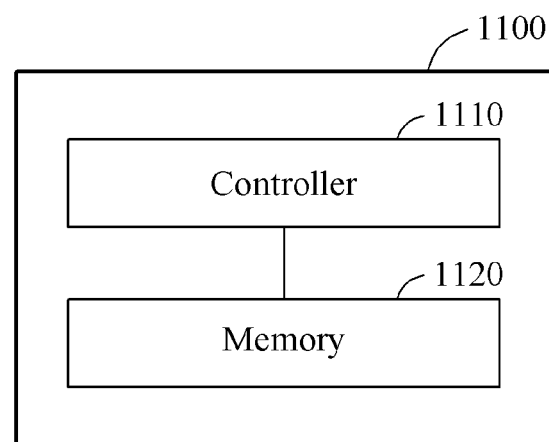
FIG. 11 is a diagram illustrating an example of a translation apparatus.

FIG. 11 is a diagram illustrating an example of a translation apparatus 1100.

Referring to FIG. 11, the translation apparatus 1100 includes a controller, or processor, 1110 and a memory 1120. The translation apparatus 1100 corresponds to a translation system described herein.

The memory 1120 includes one or more instructions executable by the controller 1110.

When the instruction is executed by the controller 1110, the controller 1110 selects a source word from a source sentence. The controller 1110 generates mapping information including location information of the selected source word mapped to the selected source word. In addition, the controller 1110 corrects a target word based on the mapping information and location information of one or more feature values of the target word.

The descriptions provided with reference to FIGS. 1 through 10 are applicable to the translation apparatus 1100, and thus a more detailed and repeated description is omitted here for brevity.

Figure 12:
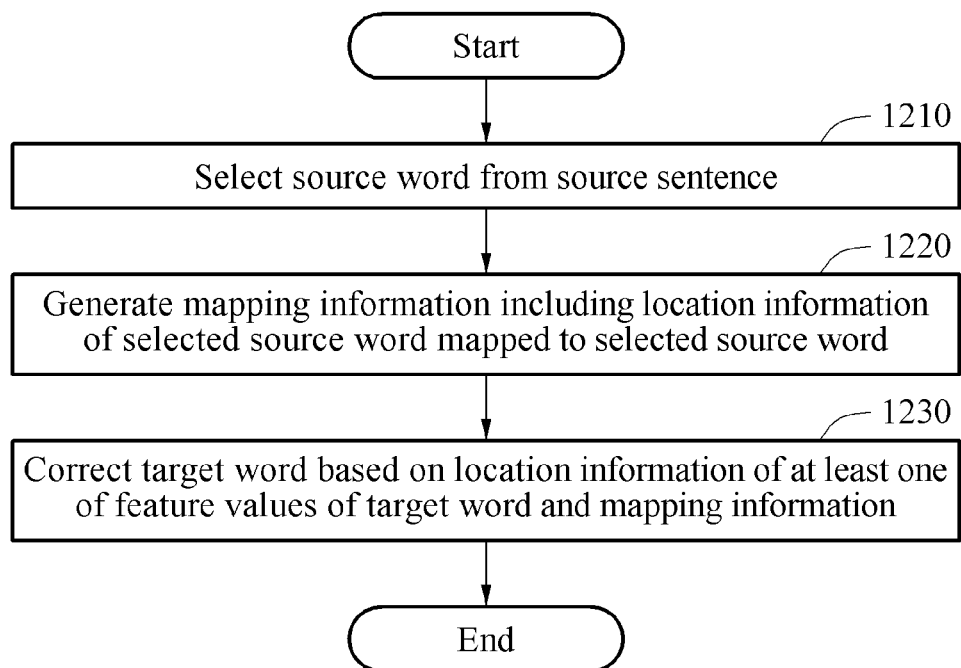
FIG. 12 is a flowchart illustrating an example of a translation method.

FIG. 12 is a flowchart illustrating an example of a translation method.

A translation method to be described hereinafter with reference to FIG. 12 may be performed by a translation apparatus or a translation system described herein.

Referring to FIG. 12, in operation 1210, the translation apparatus or the translation system selects a source word from a source sentence.

In operation 1220, the translation apparatus or the translation system generates mapping information including location information of the selected source word mapped to the selected source word.

In operation 1230, the translation apparatus or the translation system corrects a target word based on location information associated with one or more feature values of the target word and the mapping information.

The descriptions provided with reference to FIGS. 1 through 11 are applicable to the operations described with reference to FIG. 12, and thus a more detailed and repeated description is omitted here for brevity.

Figure 13:
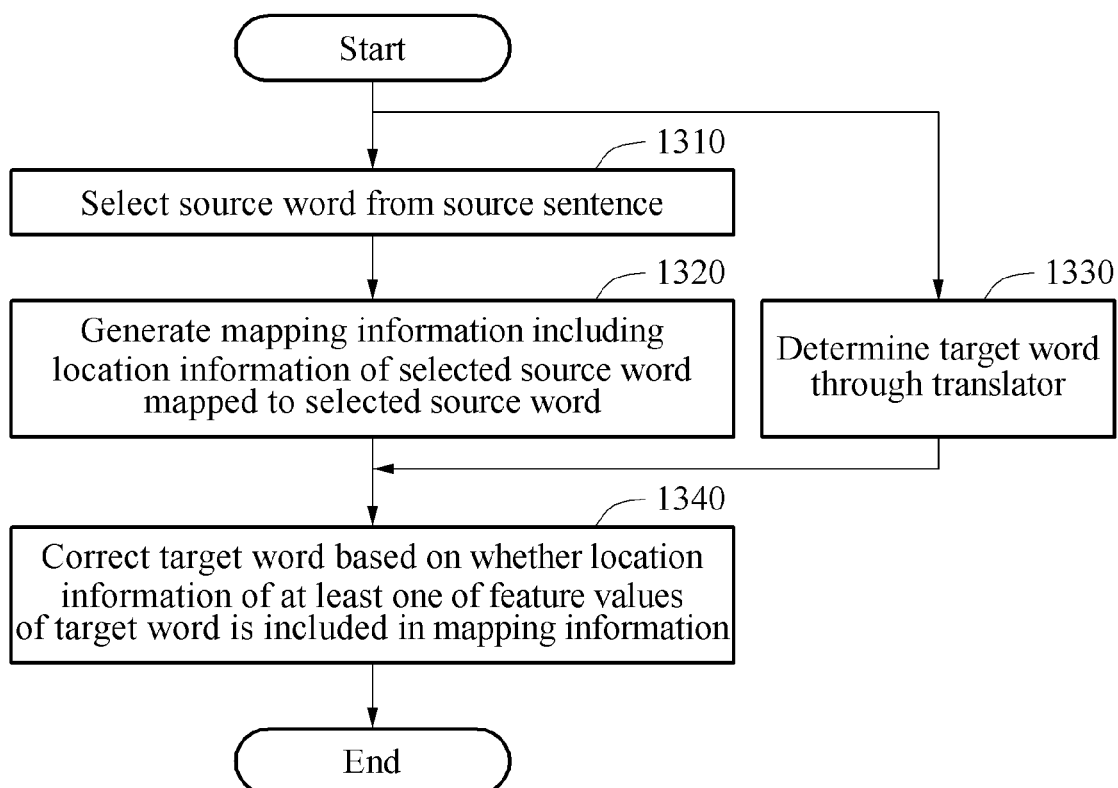
FIG. 13 is a flowchart illustrating another example of a translation method.

FIG. 13 is a flowchart illustrating another example of a translation method.

A translation method to be described hereinafter with reference to FIG. 13 may be performed by a translation apparatus or a translation system described herein.

Referring to FIG. 13, in operation 1310, the translation apparatus or the translation system selects a source word from a source sentence.

In operation 1320, the translation apparatus or the translation system generates mapping information including location information of the selected source word mapped to the selected source word.

In operation 1330, the translation apparatus or the translation system determines a target word through a translator.

In operation 1340, the translation apparatus or the translation system corrects the target word based on whether location information associated with one or more feature values of the target word is included in the mapping information.

The descriptions provided with reference to FIGS. 1 through 11 are applicable to the operations described with reference to FIG. 13, and thus a more detailed and repeated description is omitted here for brevity.

Figure 14:
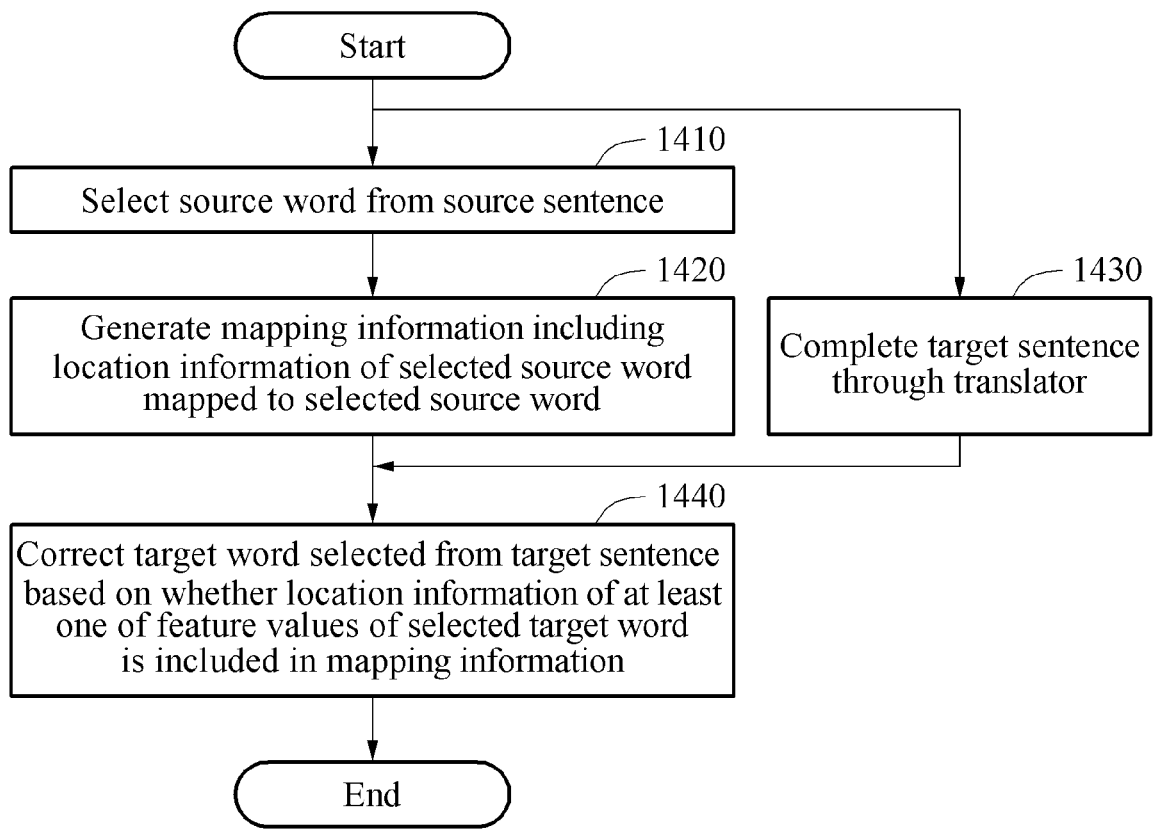
FIG. 14 is a flowchart illustrating another example of a translation method.

FIG. 14 is a flowchart illustrating another example of a translation method.

A translation method to be described hereinafter with reference to FIG. 14 may be performed by a translation apparatus or a translation system described herein.

Referring to FIG. 14, in operation 1410, the translation apparatus or the translation system selects a source word from a source sentence.

In operation 1420, the translation apparatus or the translation system generates mapping information including location information of the selected source word mapped to the selected source word.

In operation 1430, the translation apparatus or the translation system completes a target sentence through a translator.

In operation 1440, the translation apparatus or the translation system corrects a target word selected from the target sentence based on whether location information associated with one or more feature values of the selected target word is included in the mapping information.

The descriptions provided with reference to FIGS. 1 through 11 are applicable to the operations described with reference to FIG. 14, and thus a more detailed and repeated description is omitted here for brevity.

The sentence analyzer 110, the translator 120, and the corrector 130 in FIG. 1, the encoder 310, the middle network 320, and the decoder 330 in FIG. 3, and the controller 1110 and the memory 1120 in FIG. 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 4-10 and 12-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A processor-implemented machine translation method, the translation method comprising:
   selecting a source word from a source sentence;
   generating mapping information including location information of the selected source word mapped to the selected source word in the source sentence; and correcting a target word, which is generated by translating the source sentence, based on location information of determined feature values of the target word and the mapping information, wherein the translating of the source sentence further includes determining the determined feature values of the target word at a current decoding time based on a previous target word being generated at a previous decoding time, and wherein the correcting of the target word includes:

determining whether corresponding location information of a feature value, of the determined features values of the target word, is included in the mapping information; and replacing the target word with the selected source word according to the correcting, in response to a determination that the corresponding location information of the feature value, of the determined features values, is included in the mapping information.

2. The translation method of claim 1, wherein the correcting of the target word comprises in response to the target word being determined based on sub-target words, determining a maximum feature value of each of the sub-target words, and in response to location information of each maximum feature value being included in the mapping information, replacing the target word with a source word mapped to the location information of each maximum feature value.

3. A processor-implemented machine translation method, the translation method comprising:

selecting a source word from a source sentence;

generating mapping information including location information of the selected source word mapped to the selected source word in the source sentence; and correcting a target word, which is generated by translating the source sentence, based on location information of determined feature values of the target word and the mapping information, wherein the target word is replaced with the selected source word according to the correcting, and wherein the correcting of the target word comprises selecting a target word corresponding to a preset type from a target sentence generated by completing translation of the source sentence, determining whether location information of a maximum feature value of the selected target word is included in the mapping information, and in response to the location information of the maximum feature value being included in the mapping information, replacing the selected target word with a source word mapped to the location information of the maximum feature value.

4. The translation method of claim 1, wherein the correcting of the target word comprises determining a target word based on sub-target words in a target sentence generated by completing translation of the source sentence, in response to the determined target word corresponding to a preset type, determining a representative value among respective maximum feature values of the sub-target words, determining whether location information of the representative value is included in the mapping information, and in response to the location information of the representative value being included in the mapping information, replacing the determined target word with a source word mapped to the location information of the representative value.

5. The translation method of claim 1, wherein the selected source word corresponds to any one of a proper noun, a numeral, a word including a numeral and a character, a word expressed by a target language, a word not registered in a dictionary, and a phrase including any one or any combination of any two or more of a proper noun, a numeral, a word including a numeral and a character, a word expressed by a target language, and a word not registered in a dictionary.

6. The translation method of claim 1, further comprising: preprocessing the selected source word.

7. The translation method of claim 6, wherein the preprocessing of the selected source word comprises changing a transcription of the selected source word.

8. The translation method of claim 1, further comprising:

in response to the source sentence being a subword-level sentence or a character-level sentence, converting sub-source words or sub-source characters in the source sentence to a single source word.

9. The translation method of claim 8, wherein the generating of the mapping information comprises, in response to the single source word corresponding to a preset type, mapping, to the single source word, location information of each of the sub-source words or the sub-source characters in the source sentence.

10. A processor-implemented machine translation method, the translation method comprising:

selecting a source word from a source sentence;

generating mapping information including location information of the selected source word mapped to the selected source word in the source sentence; and correcting a target word, which is generated by translating the source sentence, based on location information of determined feature values of the target word and the mapping information, wherein the translating of the source sentence further includes determining the determined feature values of the target word at a current decoding time based on a previous target word being generated at a previous decoding time, wherein the target word is replaced with the selected source word according to the correcting, wherein the target word is generated by a neural machine translation of the source sentence, and wherein the correcting of the target word comprises selecting a target word corresponding to a preset type from a target sentence generated by completing translation of the source sentence, determining whether location information of a maximum feature value, from among the determined features values, of the selected target word is included in the mapping information, and in response to the location information of the maximum feature value being included in the mapping information, replacing the selected target word with a source word mapped to the location information of the maximum feature value.

11. The translation method of claim 1, wherein the correcting a target word is performed after completing translation of the source sentence into a target sentence.

12. The translation method of claim 1, wherein the correcting a target word is performed while translating the source sentence and before completing translation of the source sentence.

13. A non-transitory computer-readable storage medium storing instructions that, when executed by a processor, cause the processor to perform the method of claim 1.

14. A translation apparatus comprising:
a controller; and
a memory storing an instruction executable by the controller,
wherein the controller is configured to, in response to executing the instruction, select a source word from a source sentence,
generate mapping information including location information of the selected source word mapped to the selected source word in the source sentence, and
correct a target word, which is generated by translating the source sentence, based on location information of determined feature values of the target word and the mapping information,
wherein the translating of the source sentence further includes determining the determined feature values of the target word at a current decoding time based on a previous target word being generated at a previous decoding time, and
wherein for the correcting of the target word, the controller is configured to determine whether corresponding location information of a feature value, of the determined features values of the target word, is included in the mapping information, and replace the target word with the selected source word, in response to a determination that the corresponding location information of the feature value, of the determined features values, is included in the mapping information.

15. The translation apparatus of claim 14, wherein the controller is configured to determine whether the location information of the feature value is included in the mapping information, and to replace the target word with a source word mapped to the location information of the feature value in response to the location information of the feature value being included in the mapping information.

16. The translation apparatus of claim 14, wherein the controller is configured to determine a maximum feature value of each of sub-target words in response to the target word being determined based on the sub-target words, and to replace the target word with a source word mapped to location information of each maximum feature value in response to the location information of each maximum feature value being included in the mapping information.

17. The translation apparatus of claim 14, wherein
the controller is configured to determine whether location information of a maximum feature value of the selected target word is included in the mapping information, in response to a target word corresponding to a preset type being selected from a target sentence generated by completing translation of the source sentence, and
the controller is configured to replace the selected target word with a source word mapped to the location information of the maximum feature value, in response to the location information of the maximum feature value of the selected target word being included in the mapping information.

18. The translation apparatus of claim 14, wherein the controller is configured to
determine a target word based on sub-target words in a target sentence generated by completing translation of the source sentence,
in response to the determined target word corresponding to a preset type, determine a representative value among respective maximum feature values of the sub-target words, and determine whether location information of the representative value is included in the mapping information, and
replace the determined target word with a source word mapped to the location information of the representative value, in response to the location information of the representative value being included in the mapping information.

19. The translation apparatus of claim 14, wherein the selected source word corresponds to any one of a proper noun, a numeral, a word including a numeral and a character, a word expressed by a target language, a word not registered in a dictionary, and a phrase including any one or any combination of any two or more of a proper noun, a numeral, a word including a numeral and a character, a word expressed by a target language, and a word not registered in a dictionary.

20. The translation apparatus of claim 14, wherein the controller is configured to preprocess the selected source word.

21. The translation apparatus of claim 14, wherein the controller is configured to change a transcription of the selected source word.

22. The translation apparatus of claim 14, wherein the controller is configured to convert sub-source words or sub-source characters in the source sentence to a single source word, in response to the source sentence being a subword-level sentence or a character-level sentence.

23. The translation apparatus of claim 22, wherein the controller is configured to map, to the single source word, location information of each of the sub-source words or the sub-source characters in the source sentence, in response to the single source word corresponding to a preset type.

24. The translation apparatus of claim 14, wherein the target word is generated by a neural machine translation of the source sentence.

25. The translation apparatus of claim 14, wherein the controller is configured to correct the target word after completing translation of the source sentence into a target sentence.

26. The translation apparatus of claim 14, wherein the controller is configured to correct the target word while translating the source sentence and before completing translation of the source sentence.

27. A translation system comprising:
a sentence analyzer configured to select a source word from a source sentence, and to generate mapping information including location information of the selected source word mapped to the selected source word in the source sentence;
a translator configured to determine target words based on a translation of the source sentence, and
a corrector configured to, each time a target word, among the target words, is determined, determine whether to correct the determined target word based on location information of determined feature values of the determined target word and the mapping information, or configured to, in response to a target sentence being completed by the translator, determine whether to correct a target word, among the target words, selected from the target sentence based on location information of determined feature values of the selected target word and the mapping information,
wherein the translation of the source sentence further includes determining the corresponding determined feature values of the determined target word or the selected target word respectively generated at a current decoding time based on a previous target word being generated at a previous decoding time, and wherein the corrector is configured to determine whether corresponding location information of a feature value, of the determined features values of the target word, is included in the mapping information, and replace the determined target word with the selected source word according to the correcting, in response to a determination that the corresponding location information of the feature value, of the determined features values, is included in the mapping information.

28. The translation system of claim 27, wherein the corrector is configured to replace the determined target word with a source word mapped to location information of a maximum feature value of the determined target word, in response to the location information of the maximum feature value of the determined target word being included in the mapping information.

29. The translation system of claim 27, wherein the corrector is configured to replace the selected target word with a source word mapped to location information of a maximum feature value of the selected target word, in response to the location information of the maximum feature value of the selected target word being included in the mapping information.

30. The translation method of claim 1, wherein the location information of the source word indicates a location of the source word in the source sentence.

31. The translation method of claim 1, wherein the feature value indicates a degree to which the source word contributes to determining the target word in performing a machine translation.

32. The translation apparatus of claim 14, wherein the feature value indicates a degree to which the source word contributes to determining the target word in performing a machine translation.

33. The translation apparatus of claim 14, wherein the location information of the source word indicates a location of the source word in the source sentence.

34. The translation method of claim 3, wherein the determined feature values of the target word are feature values based on a previous target word.

35. An apparatus with machine translation, comprising:
one or more processors configured to:
implement a machine learning translation model to translate a source sentence, including:
an implementation of the machine learning translation model, for the translating of the source sentence, to generate a target word of a target sentence; and
another implementation of the machine learning translation model, for the translating of the source sentence, to generate another target word for the target sentence
based on results of the implementation of the machine learning translation model to generate the target word, and
based on respectively calculated, based on the implementation of the machine learning translation model to generate the target word,
features of the plural source words of the source sentence,
wherein, for the implementation of the machine learning translation model to translate the source sentence, the one or more processors are configured to generate a corresponding target word of the target sentence through a selective correction, based on the respectively calculated features, of the generated other target word for the target sentence.

36. The apparatus of claim 35,
wherein, in the other implementation of the machine learning translation model, the respectively calculated features of the plural source words are provided as a context vector to a decoder model of the machine learning translation model, and
wherein, for the selective correction, the one or more processors are configured to determine whether there exists an encoded vector, from among encoded vector results of respective encoder model encodings of each of the plural source words, that contributes a threshold amount to the generation of the other target word, and when the encoded vector exists, correct the other target word with a source word of the source sentence that was encoded by the encoder model to generate the encoded vector.

37. The apparatus of claim 35, wherein the selective correction of the generated other target word includes replacing the other target word with a source word of the source sentence or a transliteration of the source word.

38. The apparatus of claim 35,
wherein the implementation of the machine learning translation model to translate the source sentence further includes the one or more processors being configured to generate a copy list including indexed one or more source words of the source sentence, one or more transliterations of at least one source word of the source sentence, and/or one or more repetitions of a single source word of the source sentence respectively corresponding to encoded sub-source words of the single source word,
wherein, with respect to the selective correction, the one or more processors are configured to:
determine a feature, of the respectively calculated features, that meets a threshold;
determine whether an index location exists in the copy list with respect to the determined feature; and
correct the other target word by replacing the other target word with a word in the copy list corresponding to the index location.

39. The apparatus of claim 38, wherein the determination of the feature that meets the threshold includes determining a maximal feature value among respective values of the respectively calculated features.

40. The apparatus of claim 35, further comprising a memory storing the machine learning translation model.

41. The apparatus of claim 35, wherein the machine learning translation model to translate the source sentence includes an encoder model and a decoder model.

42. The apparatus of claim 41,
wherein the other implementation of the machine learning translation model to generate the other target word for the target sentence based on the results of the implementation of the machine learning translation model to generate the target word is implemented through a recursive neural network architecture of the decoder model, and
wherein the other implementation of the machine learning translation model to generate the other target word for the target sentence based on the respectively calculated features is implemented as an attention mechanism in the decoder model.

43. A processor-implemented machine translation method, the translation method comprising:
- generating mapping information including location information of respective one or more select source words in the source sentence;
- determining respective features with respect to each of plural source words of the source sentence;
- translating the source sentence to generate a target sentence;
- selecting a target word, from the target sentence, corresponding to a preset type;
- determining whether location information, corresponding to a determined threshold meeting feature of the determined respective features, is included in the mapping information; and
- in response to the location information of the determined threshold meeting feature, of the determined respective features, being determined to be included in the mapping information, correcting the selected target word based on the location information,
- wherein the correcting of the target word includes replacing the target word based on a source word corresponding to the location information.

* * * * *